May 20, 1924.

C. W. CLARK 1,494,459

ENDLESS TRACK VEHICLE

Filed June 7 1922    4 Sheets-Sheet 1

Inventor
C. W. Clark,
by his Attorney,

May 20, 1924.
C. W. CLARK
1,494,459
ENDLESS TRACK VEHICLE
Filed June 7, 1922    4 Sheets-Sheet 2
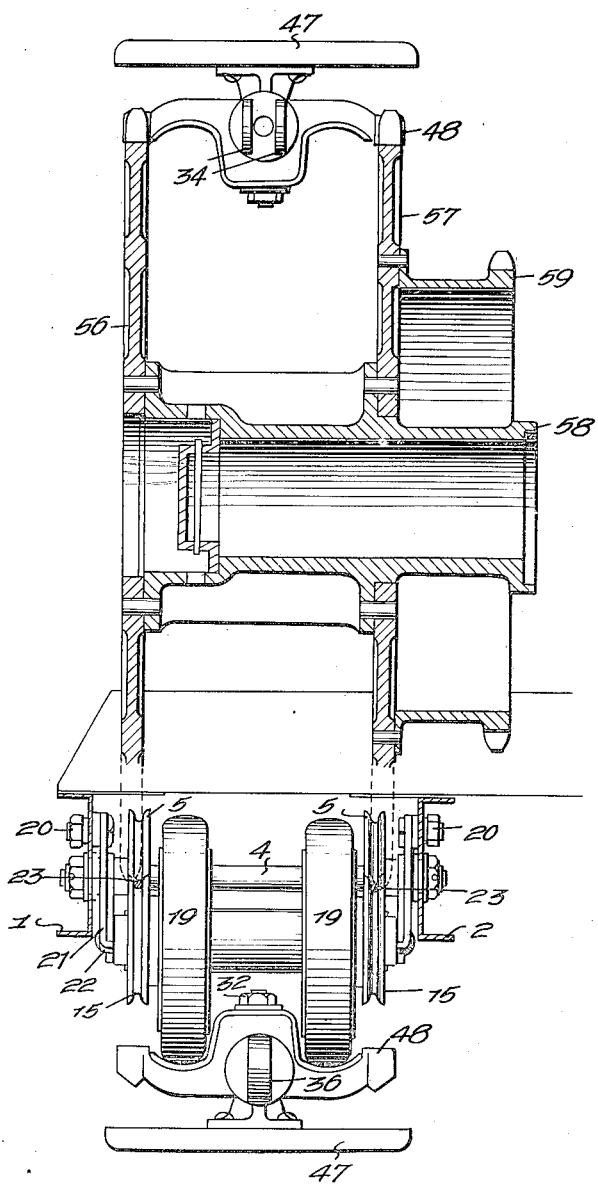
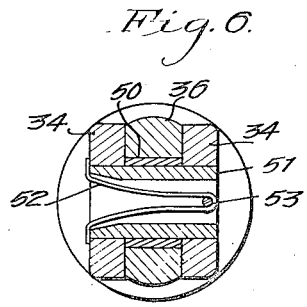
INVENTOR.
C. W. Clark,
by his attorney,
Baldwin Wright

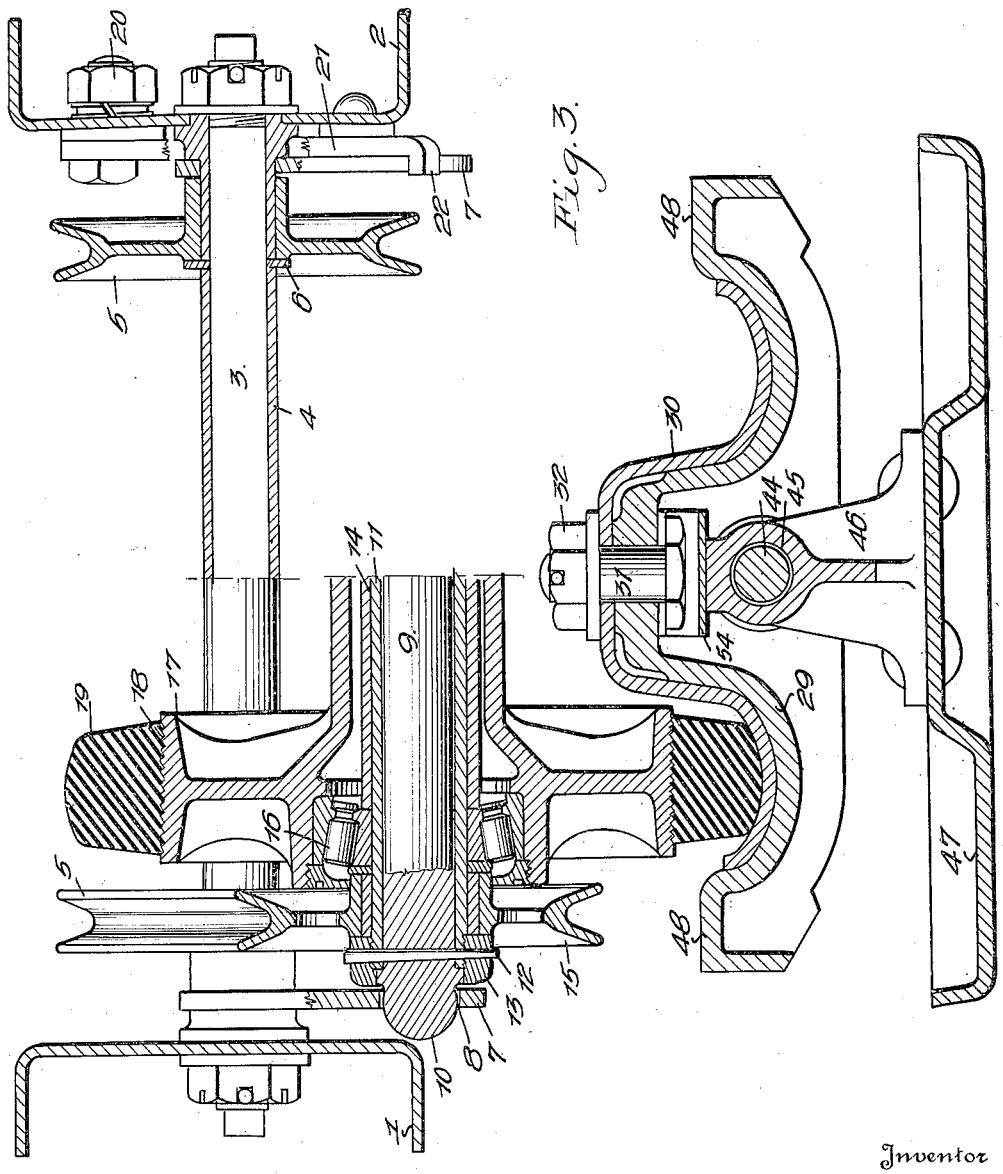

May 20, 1924.

C. W. CLARK

ENDLESS TRACK VEHICLE

Filed June 7, 1922 4 Sheets-Sheet 4

1,494,459

Inventor
C. W. Clark,
by his Attorney,

Patented May 20, 1924.

1,494,459

UNITED STATES PATENT OFFICE.

CHARLES WILLOUGHBY CLARK, OF BERMICOURT, BALSALL COMMON, NEAR COVENTRY, ENGLAND, ASSIGNOR TO ROADLESS TRACTION, LIMITED, OF LONDON, ENGLAND.

ENDLESS-TRACK VEHICLE.

Application filed June 7, 1922. Serial No. 566,564.

*To all whom it may concern:*

Be it known that I, CHARLES WILLOUGHBY CLARK, a subject of the King of Great Britain, residing at Bermicourt, Balsall Common, near Coventry, England, have invented certain new and useful Improvements in Endless-Track Vehicles, of which the following is a specification.

This invention relates to endless track vehicles of the general type described in Patents 1,329,769 granted Feb. 3, 1920 and 1,330,119 granted Feb. 10, 1920 of Philip Henry Johnson.

An object of the present invention is to provide an improved track shoe and link member for the endless track, which shall combine in a unit the link member with sprocket engaging portions, a bracket and the track shoe proper.

Another object of the invention is to provide improved connecting means for the link members.

Other objects are to provide various improved details of construction as will be evident from the following detailed description and the appended claims.

In the drawings:

Figure 2 is a transverse section on the line 2—2 of Figure 1 with parts in full lines.

Figure 3 is a sectional view on a larger scale through the wheel, track member and track shoe, together with associated parts, only one of the two wheels being shown for clearness.

Figure 6 is a section on the line 6—6 of Figure 4.

Figure 1:
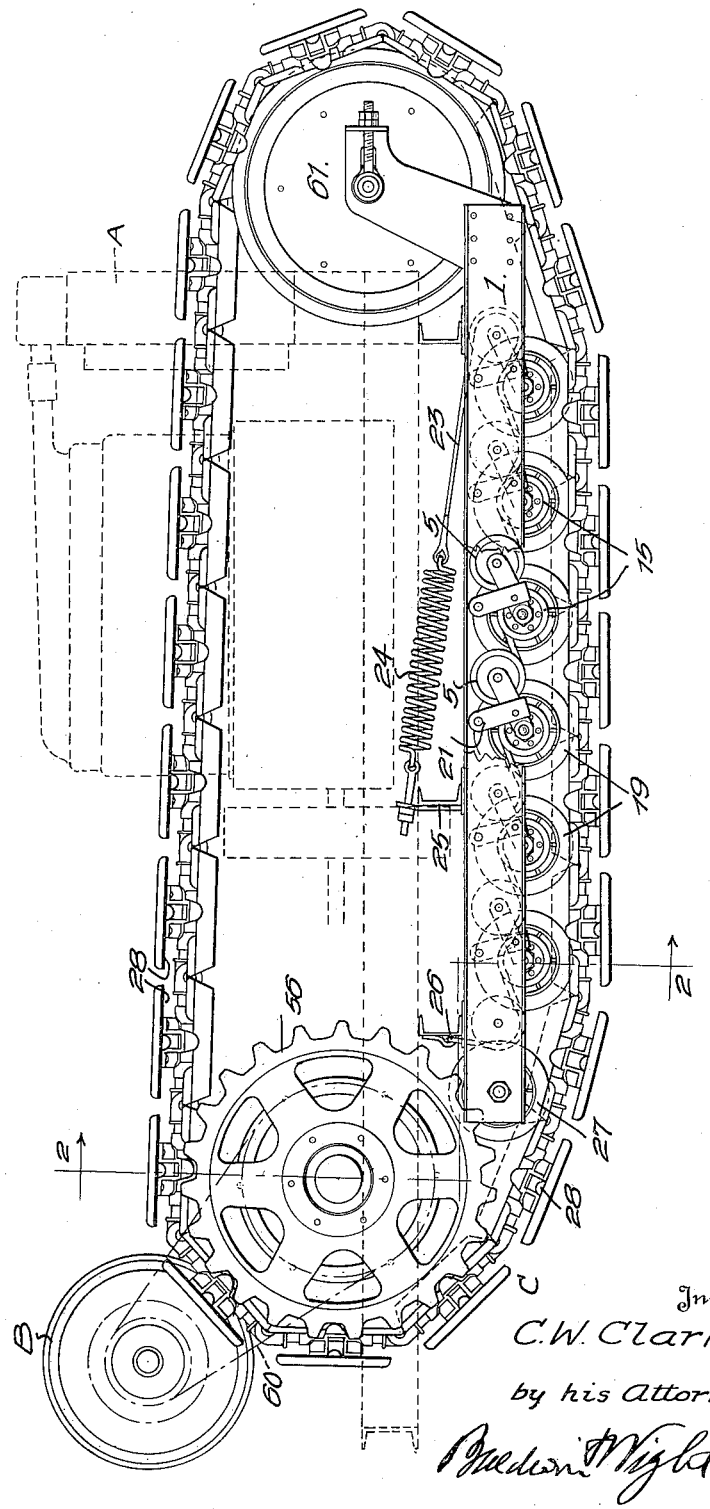
Figure 1 is a side view of an endless track unit with portions broken away and parts of the vehicle shown in dotted lines.

A vehicle A of any desired type transmits power from its engine through means such as a pulley B to an endless track member C. Mounted in any suitable manner on the frame of the vehicle are supporting members 1 and 2, illustrated in Figure 3 as channel irons, although they may be of any desired form. Supported in these members 1 and 2 are shafts 3 having sleeves 4. Pulleys 5 are fastened by pins 6 to the sleeves and turn therewith. Mounted to turn loosely on the sleeves 4 are arms 7 formed at their lower ends with openings 8 in which fit loosely the conical or rounded ends 10 of shafts 9 having sleeve members 11 and end nuts 13 pinned thereto by pins 12. Outside of the sleeve 11 is a sleeve 14 on which rotate pulleys 15. Wheel members 17 engage suitable ball bearings 16 which rest between the wheel hubs and the sleeves 11. The outer surfaces of the wheels are serrated or otherwise roughened at 18 to retain rubber tires 19 mounted thereon.

It is to be understood that the structure shown at the left of Figure 3 is duplicated at the right side of the figure, only one half of the mechanism being shown for sake of clearness.

Pivoted at 20 to the members 1 and 2 are arms 21 which extend almost vertically as shown clearly in Figure 1. These arms have angularly turned ends 22 that underlie the arms 7 which carry the spindles 10 supporting the wheels 19. These arms 21 obviously limit downward movement of the arms 7 and therefore of the wheels 19.

A rope 23 is fastened at one end to a spring 24 which is in turn attached to the frame at 25, and this rope passes under the pulleys 5 and over the pulleys 15 as clearly shown in Figure 1 and is attached at its other end to the frame at 26. This form of suspension mechanism is fully described in the Johnson patents above mentioned, and does not need detailed description here.

At one end, the frame pieces 1 and 2 carry a wheel 27 on a shaft mounted directly in the frame, and therefore fixed against any relative up and down movement.

The endless track is composed of units 28, each unit comprising a link member with track for the wheels 19, a bracket, and a track shoe supported by said bracket. The link member is shown in top plan in Figure 5, and the unit is shown in transverse section in Figure 3 and longitudinal section in Figure 4.

The link member 29 has a track member 30 attached thereto by a central bolt 31 and nut 32. This track member 30 is of the form most clearly outlined in Figure 3 and has depressed portions upon which run the pairs of wheels 19. Each link member has at one end a tubular extension 33 terminating in a bifurcated portion forming ears 34. At its opposite end it is provided with a similar portion 35 terminating in a single ear 36. The ears 34 are provided with alined openings 38 shown in dotted lines in Figure 5, and the ear 36 is provided with an opening 39 shown in dotted lines in Figure 5 and in full lines in Figure 4. In connecting the links together, the ear 36 of one link fits between the ears 34 of the adjacent link, and they are fastened together by means hereinafter described.

Figure 4:
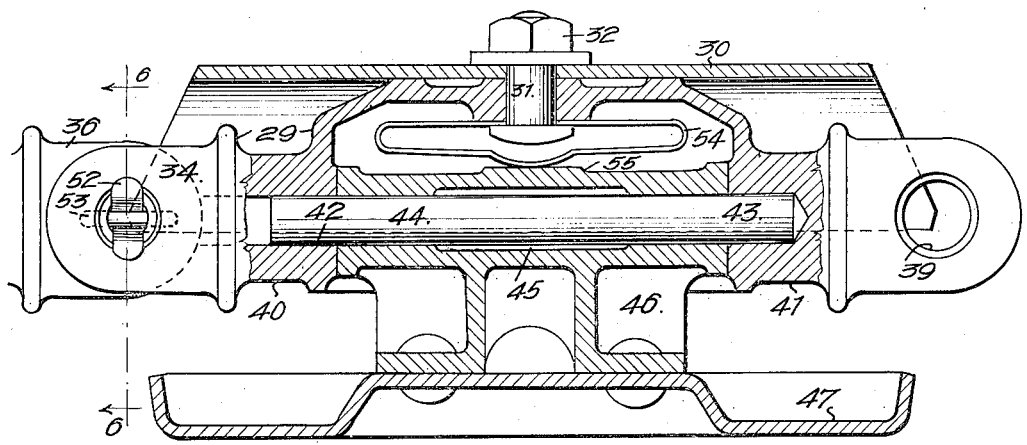
Figure 4 is a longitudinal section through the track link, the shoe bracket and the track shoe.

The link member is provided with portions 40 and 41, forming continuations of the parts 33 and 35 respectively, and these are provided with bearing openings 42 and 43 respectively as shown in Figure 4, to receive the ends of a spindle 44. This spindle passes through a longitudinal opening 45 in the body of a bracket member 46, whereby said member is suspended from the link member 29 and can oscillate about a longitudinal axis. Rigidly attached to the bracket as shown is a track shoe 47 of somewhat larger transverse dimensions than the link member.

The link member is also provided at its outer edges with portions 48 which serve to engage the sprocket wheels around which the endless track runs, as hereinafter referred to.

Figure 5:
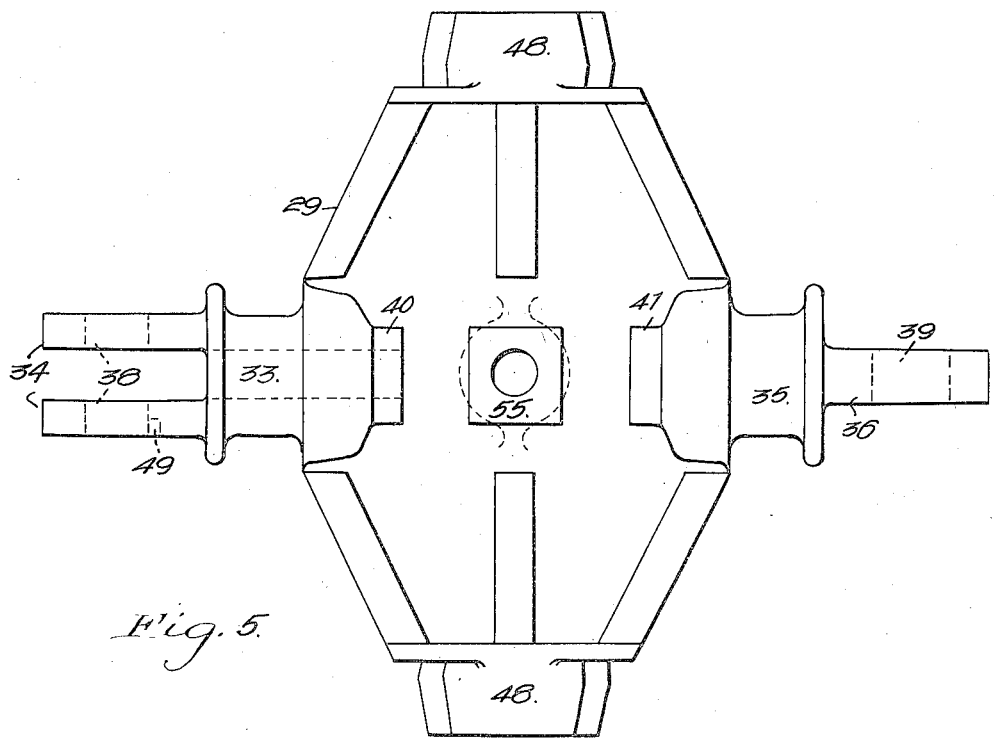
Figure 5 is a top plan of a link member.

Figure 6 shows in cross section the means for attaching the adjacent link members. The opening in the ear 36 is of larger diameter than the openings in the ears 34, and a bushing 50 is placed therein. A hollow pin 51 passes through the ears and is retained in position in the following manner. A bent spring 52 of the form shown in Figure 6 is of considerable width as shown in Figure 4. A pin 53 fits through the hollow pin 51 as shown and engages within the loop of the spring. This pin is slightly longer than the diameter of the opening in the ears 34, and in one ear there is a depression 49 in the outer surface communicating with the opening 38 as shown in Figure 5 in dotted lines. The pin 53 is placed in the hollow pin 51 which is then inserted in position, the pin at one side engaging in the opening 49 and preventing the hollow pin from passing through. Then the spring 52 is inserted from the right in Figure 6 with one branch on either side of the pin 53. When passed into position the bent over ends assume the position shown in Figure 6 preventing the removal of the hollow pin in the opposite direction, but enabling its easy removal whenever desired by releasing and removing the spring. This fastening means affords a very durable and flexible fastening for the links which cannot become accidentally displaced, but can be manually removed with no difficulty whenever desired.

A flat spring 54 of bowed form is shown in Figure 4 as bearing against the flat top 55 of the bracket 46 and having its ends engaging between the head of the bolt 31 and the top of the link member. This spring is to hold the bracket and track shoe in normal position but permits tilting about the spindle 44. Other forms of spring means may be employed instead of this exact type which is merely illustrative.

Power is communicated in any desired manner from the drum B as through ropes or belts 60 engaging a drum 59 on an axle 58 to a double sprocket wheel having sprocket members 56 and 57 as shown in Figure 2. The parts 48 of the links are formed to fit between two teeth of the sprocket, and are so spaced relatively thereto that they leave two spaces between successive parts 48. This enables the wear to be distributed over the sprocket wheels to a greater extent than in the usual construction. At the opposite side the track member passes over a wheel 61 of any desired construction.

The mounting of the track shoe and its bracket upon the longitudinal spindle 44 permits the track shoe to oscillate whenever necessary to adjust itself to the surface. The spring 54 tends to return it to normal position after any oscillation. Providing the wheel spindles 9 with rounded ends 10 fitting in openings in the arms 7, permits a certain freedom of movement of the spindles and wheels, while at the same time retaining them in definite relation to the other parts.

The effect of all of these features, particularly when taken with the specific form of rope suspension, is to give the whole device an extreme degree of flexibility without detracting in any way from its strength and durability.

The sprocket engaging portions of the link members are self clearing and will not pick up trash as is the case with many sprocket engaging elements.

While the preferred form of the invention has been illustrated it is to be understood that many details can be changed without departing from the spirit of the invention as recited in the claims.

I claim as my invention:

1. An endless track unit comprising a link member, tracks carried thereby, bearings in the link member, a spindle supported in said bearings, a bracket mounted for oscillation on said spindle, a track shoe carried by said bracket, and spring means engaging the link member and the bracket to hold the latter in normal position.

2. An endless track unit comprising a link member, means at each end thereof for attachment to adjacent link members, a double track carried thereby, sprocket engaging portions at each side of the link, and a track shoe pivotally carried by the link.

3. Endless track mechanism for vehicles comprising a series of links, tracks supported thereby, track shoes pivotally connected to the links to permit relative movement about a horizontal axis, means for connecting each link to the adjacent links, and sprocket engaging portions at the sides of said links.

4. In an endless track vehicle, a series of connected links provided with tracks, a bracket supported by each link, a track shoe pivotally supported in each bracket for oscillation about a longitudinal axis, wheels running on the tracks, an axle for said wheels, means supporting the ends of the axle and permitting relative vertical movement between its two ends, and means for limiting the downward movement of the wheels.

5. In an endless track vehicle, a series of connected links provided with tracks, a bracket supported by each link, a track shoe pivotally supported in each bracket for movement about a longitudinal axis, an axle supported in end bearings that permit relative up and down movement of the ends, said axle extending transversely of the link, a pair of wheels mounted on the axle and running on the tracks of the links, and means for limiting the downward movement of each wheel independently.

6. In an endless track vehicle, a framework, shafts mounted therein, pulleys thereon, wheel shafts, pulleys thereon, a suspension means comprising ropes passing under and over said pulleys, additional supporting means for the ends of each wheel shaft that permits relative up and down movement of the ends, a series of connected links having trackways, wheels on the wheel shafts and running on said trackways, and each link having a track shoe carried thereby and mounted for oscillation about a longitudinal axis.

In testimony whereof, I have hereunto subscribed my name.

CHARLES WILLOUGHBY CLARK.